No. 819,028. PATENTED APR. 24, 1906.
W. STANLEY.
METHOD OF TRANSMITTING POWER BY ELECTRIC CURRENTS.
APPLICATION FILED NOV. 10, 1904.
3 SHEETS—SHEET 1.
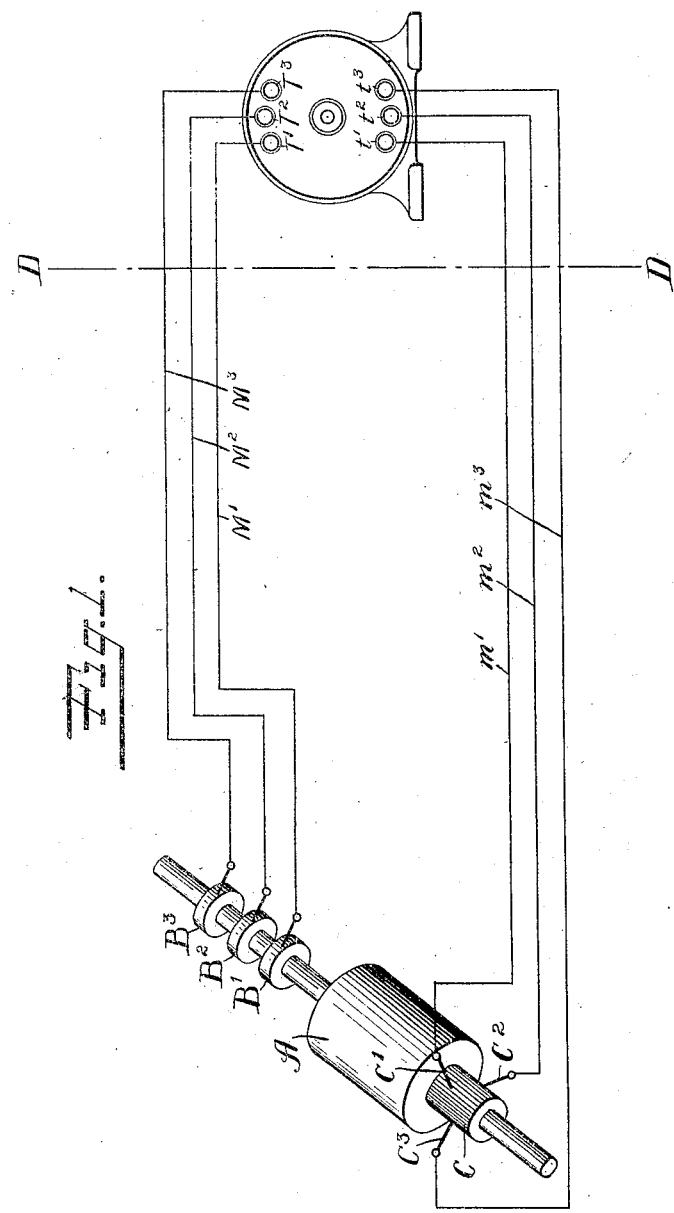
Witnesses
Inventor
William Stanley

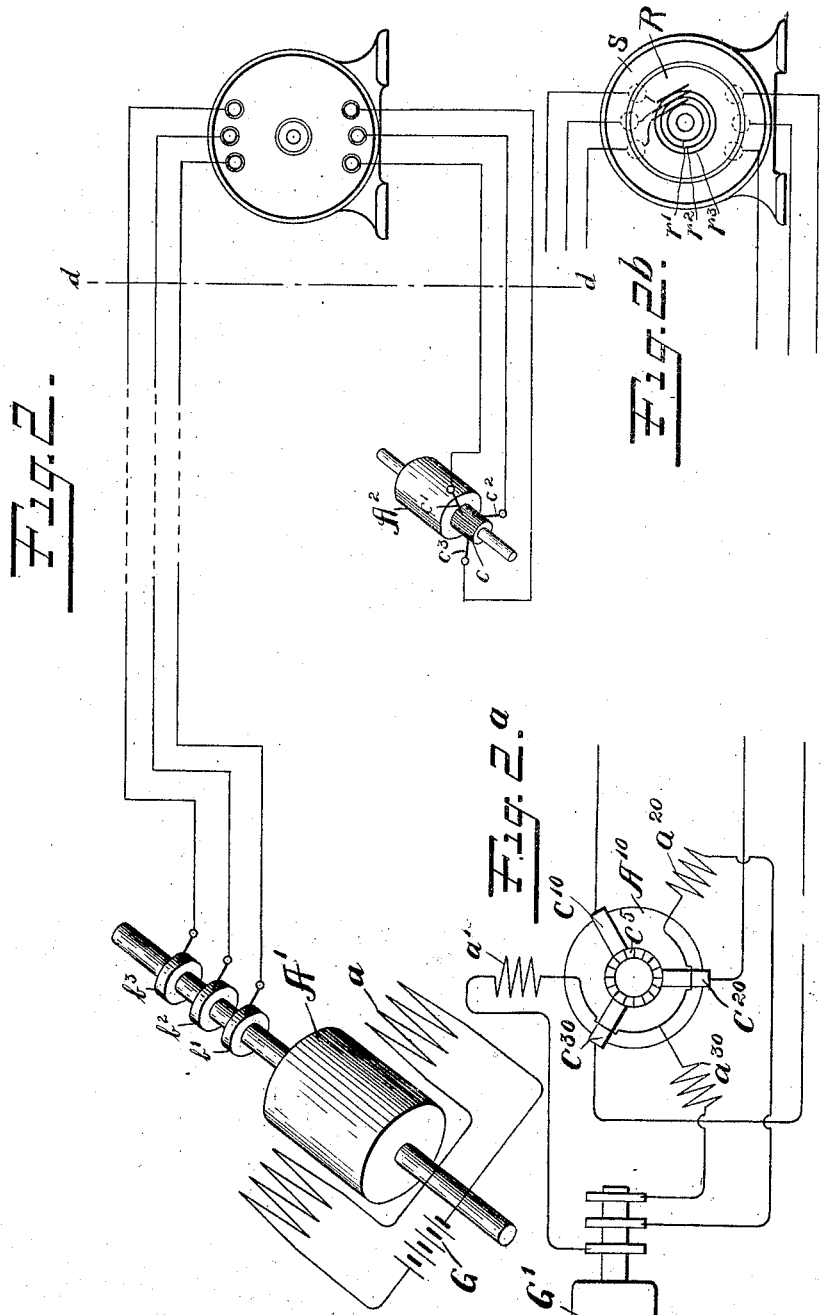

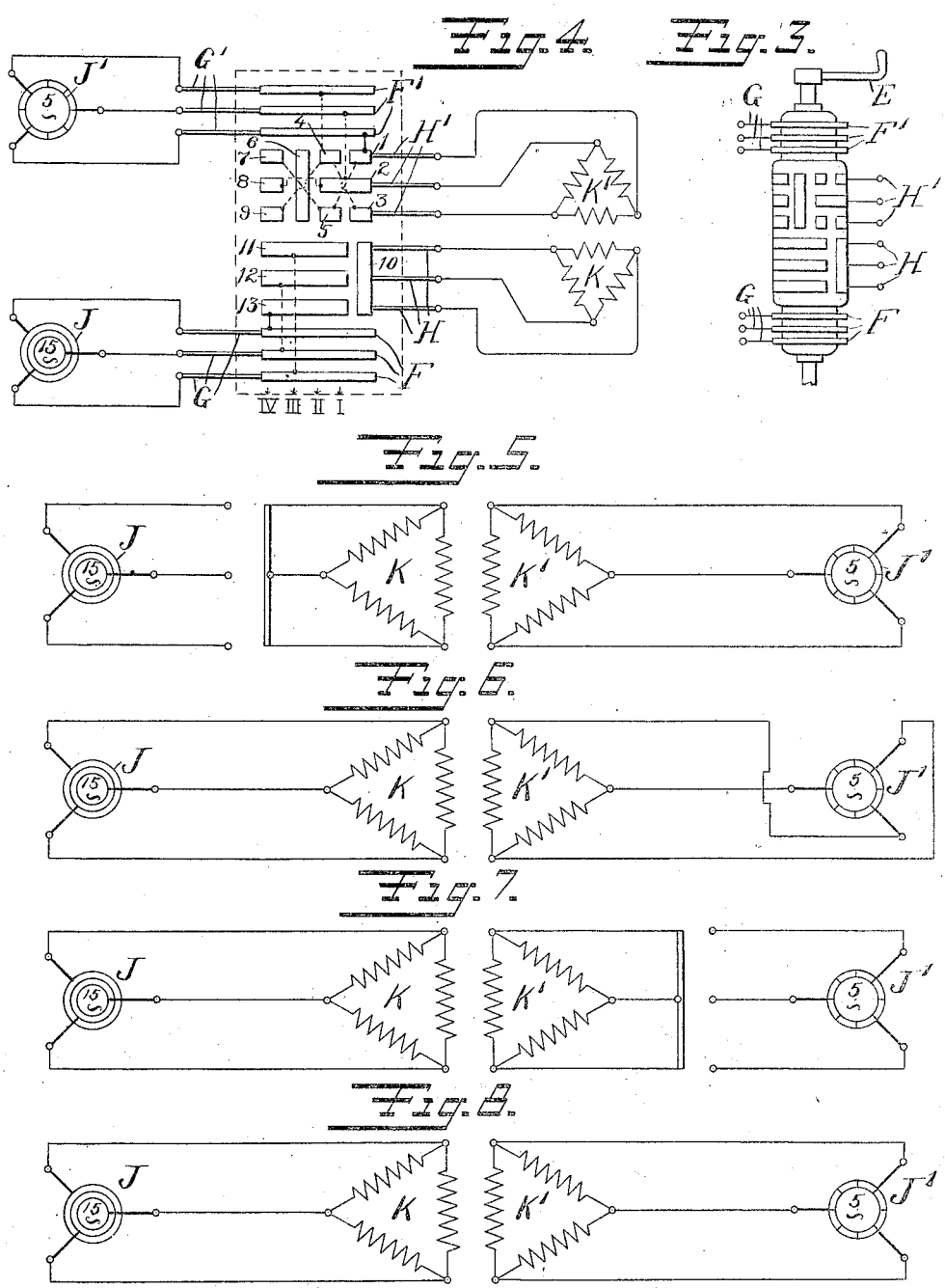

UNITED STATES PATENT OFFICE.

WILLIAM STANLEY, OF GREAT BARRINGTON, MASSACHUSETTS.

METHOD OF TRANSMITTING POWER BY ELECTRIC CURRENTS.

No. 819,028. Specification of Letters Patent. Patented April 24, 1906.

Original application filed July 19, 1904, Serial No. 217,171. Divided and this application filed November 10, 1904. Serial No. 232,122.

*To all whom it may concern:*

Be it known that I, WILLIAM STANLEY, a citizen of the United States, residing at Great Barrington, county of Berkshire, and State of Massachusetts, have invented certain new and useful Improvements in Methods of Transmitting Power by Electric Currents, of which the following is a full, clear, and exact description.

My invention relates to a method of transmitting power by electric currents, and particularly to a method of transmitting power by polyphase alternating currents differing in frequency from each other.

The object of my invention is to furnish a method for transmitting power in which alternating currents differing in phase and in frequency are generated and utilized. One or both of these frequency-differing alternating currents are used to develop so-called "rotating" magnetic fields, acting as hereinafter described.

A further object of the invention is the production of a method of developing by said frequency-differing alternating currents rotating fields upon a motor, rotor, and stator and controlling of their relative directions of rotation with relation to one another.

A further object of the invention is to provide a method of operating alternating-current motors at different or varying speeds.

A further object of my invention is to provide a method of changing the relative rotations of said fields for permitting the motor to be operated by either of said currents alone, producing thereby a progressively-increasing speed in the motor.

Some features of my invention may be carried out either by systems in which the frequency-differing alternating currents are both generated by a single main generator or by systems in which one of the frequency-differing alternating currents is generated in the main generator, while the other is generated in an auxiliary or local generator.

In carrying out my invention I preferably make use of a motor which can be operated either as an induction-motor or as a motor having both elements supplied with alternating currents. In the latter case the motor has certain characteristics of a synchronous motor, especially that of speed independent of the load.

The means for utilizing the alternating currents may be widely varied. In the particular embodiment for carrying out the invention illustrated an alternating-current motor having a rotor and stator is used, both of the elements or members of the motor being so wound that either element or member may be caused to act inductively upon the other. The conductors on the rotor or stator may either of them be short-circuited or closed through suitable resistances or may both be supplied with alternating currents from external mains to produce rotating magnetic fields therein. Suitable means are also provided, and the circuits are so controlled that the direction of relative rotation of the rotating magnetic fields may be reversed.

In order to produce the starting of the motor, the electrical conductors on one of the members are short-circuited and the electrical conductors of the other member are supplied with alternating currents, producing a rotating magnetic field of a predetermined frequency. If the motor is to run at the lowest speed, the conductors of one member are supplied with alternating currents, so as to produce a rotating field of the lowest frequency generated in the system, and the conductors on the other member of the motor are short-circuited after closing the conductors through suitable resistances. In the apparatus illustrated this may be accomplished by short-circuiting the conductors on the rotor and supplying the conductors of the stator with alternating currents of five periods per second, so as to produce therein a rotating magnetic field of a frequency equal to five periods per second. In the particular apparatus illustrated, in which magnetic circuits are used for developing the rotating magnetic field, if a five-period rotating field is produced in the rotor the rotor will revolve under the condition mentioned three hundred times a minute less the slip. The direction of rotation will be opposite to that of the rotating field. If now one of the elements—for example, the stator—be supplied with alternating currents, so as to develop therein a rotating magnetic field of a frequency equal to fifteen periods per second and tending to produce motion in the same direction as that produced in starting and if at the same time there is developed in the other element—for example, if the rotor be supplied with alternating currents so as to produce a rotating magnetic field of five periods per second the direction of rotation of which is the same as that of the direction of rotation of the field in the stator—the rotor will revolve at a speed equal to the difference between fifteen periods per second and five periods per second—that is to say, at six hundred revolutions per minute. The direction of rotation of the rotor will be the same as that of the rotating magnetic fields.

If one of the elements of the motor—for example, the stator—is supplied with alternating currents of fifteen periods per second, so as to produce therein a magnetic field of the same periodicity rotating in the same direction as before and if at the same time the conductors on the other elements—for example, the rotor—be short-circuited or closed to suitable resistances, the rotor will revolve in the same direction as that of the rotating field and at a frequency equal to that of the field—that is, at nine hundred revolutions per minute less the slip.

If the stator be supplied with alternating currents so as to produce a magnetic field of fifteen periods per second rotating in the same direction as before and if the rotor be supplied with alternating currents so as to produce therein a rotating magnetic field of five periods per second revolving in a direction opposite to that of the magnetic field in the stator, then the rotor will have to move at a speed equal to the sum of the speeds of rotation of the rotating magnetic fields—that is to say, at twenty periods per second or twelve hundred revolutions per minute.

In the same manner if both elements are supplied with alternating currents so as to produce rotating fields corresponding to fifteen periods per second the speed of the rotor will be thirty periods per second or eighteen hundred revolutions per minute.

The following is a description of a system and apparatus for carrying out my invention, reference being had to the accompanying drawings, in which—

Figure 1 shows diagrammatically a system in which the frequency-differing alternating currents are generated in a single main generator. Fig. 2 represents a system in which one of the frequency-differing alternating currents is generated in a main generator and the other is generated in an auxiliary or local generator. Fig. 2ª shows diagrammatically the means for supplying low-frequency currents. Fig. 2ᵇ shows diagrammatically the connections with the stator and rotor of the motor. Fig. 3 shows a controller for controlling the speed of the motor by connecting it with one or both sources of frequency-differing currents in such a way as to produce progressive variations in motor speed. Fig. 4 is a diagrammatic view showing the controller and its connections with the various motor and generator circuits. Fig. 5 shows the connections between the motor and generator circuits in the position of lowest speed, the currents at that time being supplied by the mains of lowest frequency. Fig. 6 shows the connections for the higher speed, the currents at that time being supplied by mains of both frequencies. Fig. 7 shows the connections for the next higher speed, the currents being supplied from the mains of higher frequency. Fig. 8 shows the connections for the next higher speed, the currents being supplied by mains of both frequencies.

Referring more particularly to the drawings, in Fig. 1, A represents a two-frequency alternating-current generator of the three-phase type, such as described in my copending application, Serial No. 194,023, filed February 17, 1904, in which the field is energized by low-frequency three-phase currents, so as to produce three-phase differing magnetic fields. The armature is connected to the collector-rings $B'$ $B^2$ $B^3$ and also to a commutator $C$, on which bear brushes $C'$ $C^2$ $C^3$, separated from each other by one hundred and twenty degrees. From the rings lead mains $M'$ $M^2$ $M^3$, which are connected to motor-terminals $T'$ $T^2$ $T^3$, in turn connected to the windings of one of the elements of the motor. From the brushes $C'$ $C^2$ $C^3$ lead mains $m'$ $m^2$ $m^3$, which are connected to the terminals $t'$ $t^2$ $t^3$, which are connected to the windings of the other element of the motor. At some intermediate point, such as represented by the line $DD$, the controller, hereinafter described, is inserted.

In Fig. 2 the main generator $A'$ (an ordinary three-phase generator) is provided with collecting-rings $b'$ $b^2$ $b^3$, which are connected to the motor in the same manner as the corresponding rings of the system of Fig. 1. $A^2$ is any suitable auxiliary or local generator of low-frequency currents, preferably a generator having its field supplied with three-phase currents, preferably of lower frequency than the currents of the main generator, the armature being provided with a commutator upon which bear brushes $c'$ $c^2$ $c^3$, producing phase-differing alternating currents of the same frequency as those impressed upon its field in the same manner as described in my copending application, Serial No. 180,641, filed November 11, 1903. These brushes are connected by mains with the motor in the same manner in which the corresponding brushes of Fig. 1 are connected, the controller being inserted at a point $d\,d$ intermediate between the motor and the generator.

The windings for energizing the fields of the generators A of Fig. 1 and $A^2$ of Fig. 2 are shown diagrammatically in Fig. 2ª, in which $A^{10}$ represents the armature, $a^{10}$ $a^{20}$ $a^{30}$ represent three-phase energizing-windings supplied with three-phase currents of the desired low frequency from the generator $G'$, and $C^{10}$ $C^{20}$ $C^{30}$ represent the brushes corresponding to either the brushes $C'$ $C^2$ $C^3$ of Fig. 1 or $c'$ $c^2$ $c^3$ of Fig. 2.

$C^5$ represents the commutator corresponding to either the commutator $C$ of Fig. 1 or $c$ of Fig. 2 and on which the brushes $C^{10}$ $C^{20}$ $C^{30}$ bear. The commutator-brushes are, as shown in Figs. 1 and 2, connected to terminals near the base of the motor. These, as shown diagrammatically in Fig. 2<sup>b</sup>, are stator-terminals. The terminals at the upper part of the motor are, through brushes and slip-rings $r'$ $r^2$ $r^3$, connected with the rotor of the motor, so that the rotor is energized by the currents of higher frequency.

The controller in Fig. 3 consists of a cylinder provided with a handle E for operating the same. Upon the cylinder are mounted six collecting-rings F F', with which the brushes G G' may contact. Upon the central portion of the cylinder are placed two series of contact-plates, those of one series successively acting to make contact with the brushes H, while those of the other series act to successively make contact with the brushes H'. In the development of these contacts shown in Fig. 4 they are numbered 1 to 13. Contacts 1 5 7 are electrically connected, also 2 and 8, also 3 4 9. The plates 1, 2, and 4 are also each connected with one of the rings F. The plates 11, 12, and 13 are each connected with one of the rings F', as shown in Fig. 4. The connections between the generator-brushes and the motor-circuits will also be clear from Fig. 4. In this figure and in Figs. 5, 6, 7, and 8, J' represents a source of low-frequency three-phase currents, such as will be furnished by either the commutator C, Fig. 1, or the commutator c, Fig. 2, of the frequency, for example, of five alternations per second. J represents a generator supplying three-phase currents of a higher frequency—for example, fifteen alternations per second—corresponding to either the collectors $B'$ $B^2$ $B^3$ of Fig. 1 or $b'$ $b^2$ $b^3$ of Fig. 2. K K' represent the windings of the motor elements, it being immaterial which is regarded as stator and which as rotor. I II III IV represent the four main running positions of the controller. The connections for these four positions are shown in detail in Figs. 5, 6, 7, and 8, respectively.

In the position I the windings K of one member of the motor are short-circuited by the plate 10, while the windings K' of the other member are supplied with low-frequency currents through the plates 1, 2, and 3, the result being that the connections are shown, as in Fig. 5, the motor operating as an induction-motor supplied with currents of a frequency of five periods per second.

In position II the windings K' of the motor are supplied through plates 4, 2, and 5 with low-frequency currents, while the windings K of the motor are supplied through the plates 11, 12, and 13 with currents of a higher frequency—namely, fifteen periods per second. The connections are such, however, that while the currents of high frequency tend to produce rotation in the same direction as was formerly produced the currents of low frequency tend to produce rotation in the opposite direction, with the result that a differential frequency is produced equal to what would result from a synchronous action of a current of ten periods. The circuits are shown in Fig. 6.

In the next position (III) the plate 6 acts to short circuit the windings K', while the windings K, being connected to the high-frequency mains through plates 11 12 13, causes the motor to run in the same direction as an induction-motor at an increased speed, due to the action of the currents from high-frequency mains. The circuits are shown in Fig. 7.

In the next position (IV) the windings K' are connected through the plates 7, 8, and 9 to the low-frequency mains in the same order in which they were originally connected with the plates 1, 2, and 3, while the windings K are connected with the plates 11, 12, and 13, the result being that the currents of different frequency both tend to make the motor operate in the same direction, resulting in a further increase in speed equal to twenty periods. The circuits are shown in Fig. 8.

My invention permits of various modifications and constitutes an efficient method of operating motors by alternating currents and, furthermore, a simple method of operating alternating currents moved at different speeds.

This application is a division of an application filed by me July 19, 1904, Serial No. 217,171.

What I claim is—

1. The method of transmitting power at varying speeds by alternating currents which consists in impressing upon the rotor element of a motor a field due to alternate currents of one frequency, and impressing upon the stator element a field due to alternating currents of a different frequency and varying the relative direction of rotation of the impressed fields.

2. The method of transmitting power at varying speeds by alternating currents which consists in supplying one member of a motor with alternate currents of a given frequency and short-circuiting the windings of the second member and subsequently supplying said second member with currents of different frequency and short-circuiting the windings of said first-mentioned member, said frequencies being both independent of the rate of rotation of said rotor.

3. The method of transmitting power at varying speeds by alternating currents which consists in supplying one member of a motor with alternate currents of a given frequency and short-circuiting the windings of the second member and subsequently supplying said second member with currents of higher frequency and short-circuiting the windings of said first-mentioned member and at an intermediate time supplying both elements with currents of different frequencies so as to produce an intermediate speed.

4. The method of transmitting power at varying speeds by alternating currents which consists in supplying one member of a motor with alternate currents of a given frequency and short-circuiting the windings of the second member and subsequently supplying said second member with currents of higher frequency and short-circuiting the windings of said first-mentioned member and at a still later time supplying both members respectively with said frequency-differing currents so as to produce a still higher speed of the rotor element.

WILLIAM STANLEY.

Witnesses:
H. M. SMITH,
LEONARD R. C. CLARK.